(12) United States Patent
Robinson

(10) Patent No.: US 7,516,687 B2
(45) Date of Patent: Apr. 14, 2009

(54) LIVE CENTER SEALING METHOD AND SYSTEM

(75) Inventor: James Robinson, Washington Court House, OH (US)

(73) Assignee: Riten Industries, Inc., Washington C. H., OH (US)

( * ) Notice: Subject to any disclaimer, the term of this patent is extended or adjusted under 35 U.S.C. 154(b) by 815 days.

(21) Appl. No.: 10/920,319

(22) Filed: Aug. 18, 2004

(65) Prior Publication Data

US 2006/0037444 A1 Feb. 23, 2006

(51) Int. Cl.
*B23B 23/04* (2006.01)
*F16J 15/32* (2006.01)

(52) U.S. Cl. .............................. 82/150; 82/148; 277/412

(58) Field of Classification Search .................... 82/148, 82/150; 277/412, 416, 421
See application file for complete search history.

(56) References Cited

U.S. PATENT DOCUMENTS 4,869,140 A * 9/1989 Alexander ................... 82/150
6,065,755 A * 5/2000 Fedorovich ................. 277/421
2002/0000141 A1 * 1/2002 McMillian ................... 82/148

OTHER PUBLICATIONS

Page 18, cover and title pages, of Röhm Products of America catalogue.
Various pages from Motor Tool Manufacturing Co. catalogue dated 1986.

* cited by examiner

*Primary Examiner*—Willmon Fridie
(74) *Attorney, Agent, or Firm*—Baker & Hostetler LLP

(57) ABSTRACT

A system and method for sealing a live center is provided. The live center has a spindle disposed, at least in part, within a housing, bearings provide a rolling connection between the spindle and the housing, and a labyrinth seal is mounted to at least one of the spindle and the housing and is configured to reduce an amount of contaminant from entering the housing. A method of sealing a live center is also provided. In some embodiments of the invention, the method includes restricting a fluid path along a spindle, defining the fluid path to have a labyrinth section, providing a drain to the outside of the live center for fluid moving along the path and substantially blocking the path of the resilient seal.

23 Claims, 2 Drawing Sheets

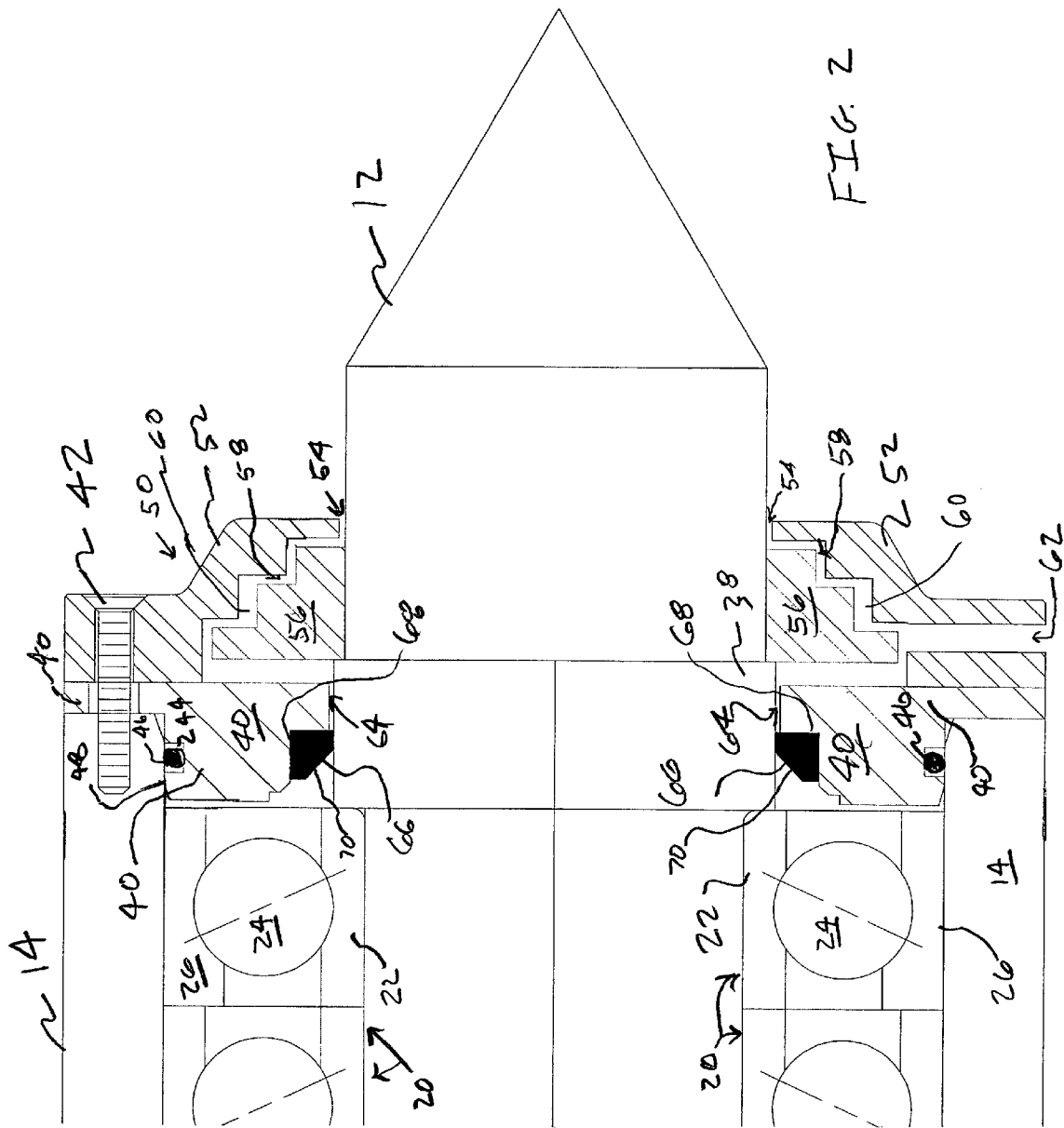

LIVE CENTER SEALING METHOD AND SYSTEM

FIELD OF THE INVENTION

The present invention relates generally to sealing a live center for use with a lathes, grinders, mills, and other machine tools. More particularly, the present invention relates to sealing the spindle portion of the live center with the housing for both resistance against contaminants entering the live center and retaining lubricating oil or grease within the bearings of the live center.

BACKGROUND OF THE INVENTION

Machine tools generally hold a work piece at one end with a chuck. Often, the other end of the work piece will be supported, steadied or otherwise contacted by a live or dead center. A dead center is a device that contacts a work piece without rotating. A live center is a device that contacts a work piece and the portion of the center that contacts the work piece rotates along with the work piece.

The portion of the live center that rotates along with the work piece is known as a spindle. The spindle is mounted within a housing where the housing of the live center generally does not rotate. Bearings are used to support and facilitate the rotation of the spindle within the housing. Often, it is desirable to provide lubrication for the bearings. In instances where lubrication is used, oil can leak out of the live center or seep along the spindle thus depriving the bearings of lubrication.

Accordingly, it is desirable to provide a method and apparatus that substantially seals the oil within the live center so that the oil can provide lubrication for the bearings.

Live centers are also hampered by other problems. For example, modern manufacturing techniques include using heavy amounts of coolant, also referred to as cutting fluid, when working on a work piece in a machine tool. The work piece may be constantly subjected to a high-pressure stream or streams of fluid which provide several functions. Among the functions performed are that the coolant keeps the work piece and cutting tool cool, and removes chips and other unwanted material from the area being cut by the cutting tool.

The cutting fluid may have in suspension chips or material of the work piece that has been removed by the cutting process. Should some of this fluid and its accompanying material enter the live center, it could potentially interfere with the rotation of the spindle within the live center. For example, chips could jam between the spindle and some other portion of the live center such as the bearings. Also, the chips or material can damage the bearings and bearing races preventing them from operating efficiently or, in the extreme case, jam the spindle from rotating. Alternatively, cutting fluids usually degrade the effectiveness of the lubricant used in the bearings, again creating a variety of problems.

Accordingly, it is desirable to provide a method and apparatus which substantially seals the interior of the live center from contaminants such as cutting fluid, chips and other unwanted material from entering the live center.

SUMMARY OF THE INVENTION

The foregoing needs are met, to a great extent, by the present invention, wherein in one aspect, an apparatus and method is provided that in some embodiments substantially seals the live center to contain lubricating oil within the areas within the live center where the lubricating oil is desired and reduces the amount of the likelihood of the lubricating oil working its way out of the desired areas and depriving the bearings and other moving parts from the benefits of lubrication.

In another aspect an apparatus and method is provided that in some embodiments substantially seals the live center from contaminants such as cutting fluid, chips and other unwanted material from entering the live center and potentially interfering with the rotation of the spindle within the housing and/or reducing the effectiveness of the bearings within the live center.

In accordance with one embodiment of the present invention, a live center is provided. The live center includes a housing, a spindle disposed, at least in part, within the housing; bearings providing a rolling connection between the spindle and the housing; and a seal mounted to at least one of: the spindle and the housing; and configured to reduce an amount of contaminant from entering into the housing. In some embodiments of the invention, the seal is a labyrinth seal having a shield connected to the spindle and a cover connected to the housing.

In accordance with another embodiment of the present invention, the live center is provided. The live center includes a housing; a spindle mounted in the housing; a first seal for impeding contaminant from entering the housing along the spindle; a second seal for impeding contaminant from moving along the spindle; and a third seal for impeding contaminant from moving along the spindle.

In accordance with another embodiment of the present invention, a live center is provided. The live center includes a housing; a spindle located in the housing; a first sealing means for impeding fluid from moving along the spindle toward the housing; and a second sealing means for reducing a pressure associated with a contaminant when the contaminant contacts the first sealing means.

In accordance with yet another embodiment of the present invention, a method of sealing a live center is provided. The method of sealing the live center includes: restricting a fluid path along a spindle; defining the fluid path to have a labyrinth section; and substantially blocking the path with a resilient seal.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 2 is an enlarged side cross-sectional view of a front portion of the live center shown in FIG. 1.

DETAILED DESCRIPTION

Figure 1:
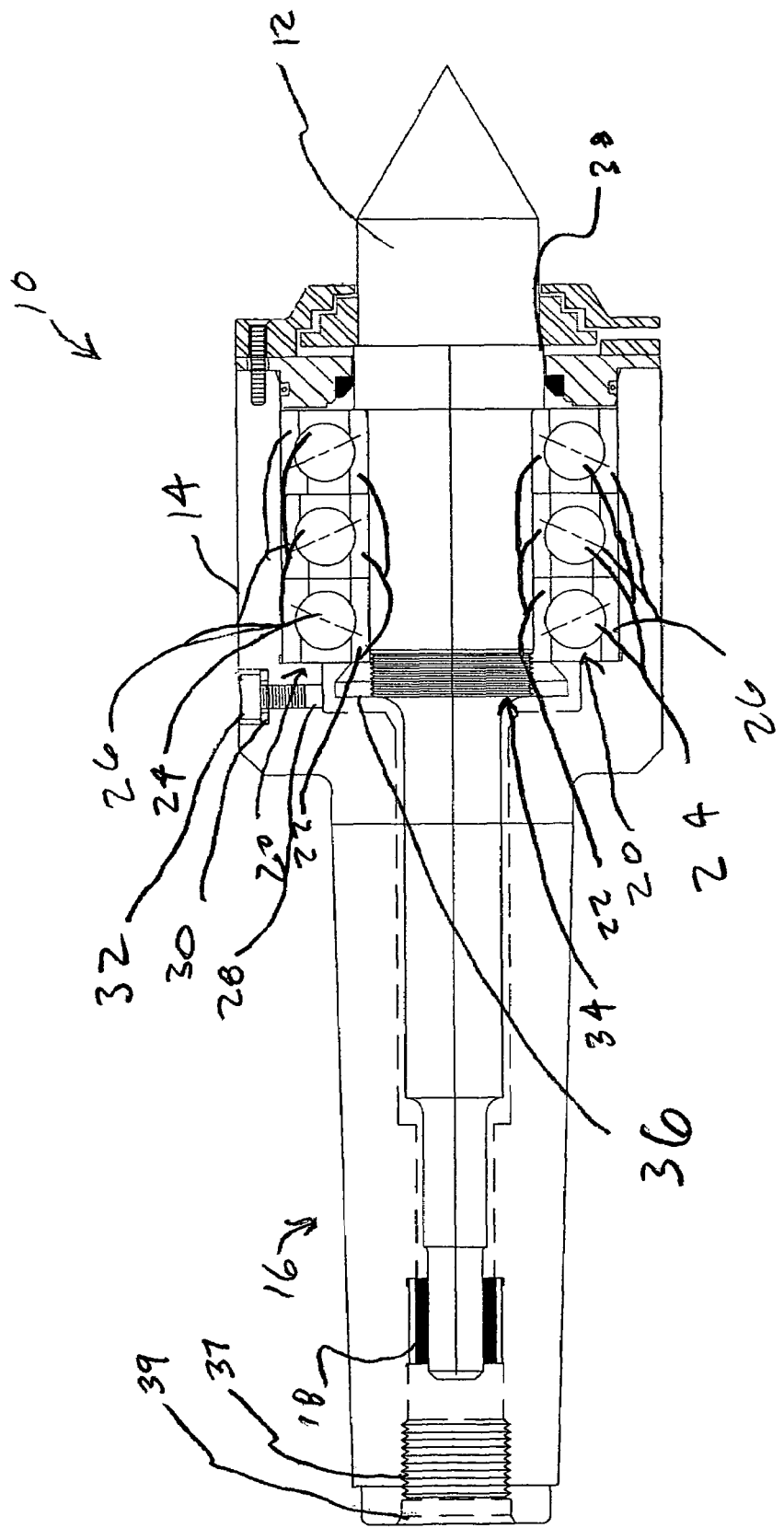
FIG. 1 is a cross-sectional side view of a live center in accordance with a preferred embodiment of the invention.

The invention will now be described with reference to the drawing figures, in which like reference numerals refer to like parts throughout. An embodiment in accordance with the present invention includes a live center having several sealing elements designed and configured to reduce or eliminate contaminants such as cutting fluid, chips and other debris from entering the live center. In some embodiments of the present invention, other sealing means are employed to reduce the amount of lubricant from leaving the bearings within the live center. In some embodiments of the present invention, some of the sealing elements may provide the dual functions of excluding contaminants from entering the live center and retaining lubricant within the live center.

FIG. 1 illustrates the live center 10 in accordance with present invention. As shown in FIG. 1, the live center 10 includes a spindle 12. The spindle 12 is located within the housing 14. The rear portion of the housing 14 has a taper 16 that is configured to fit and mount in a lathe. The taper 16 shown is known as a number 5 Morse taper (MT). While a live center 10 having a number 5 MT is shown, other tapers or profiles may be used in accordance with the present invention and embodiments of the invention are not limited to that as shown.

The rear portion of the spindle 12 is supported by needle bearings 18 which permit the spindle 12 to rotate. The spindle 12 is also supported by ball bearings 20 which also permit the spindle 12 to rotate. Having the two sets of bearings 18 and 20 spaced from each other permit the spindle 12 to be supported and be able to turn. The ball bearings 20 comprise three elements. There is an inner race 22 that contacts the spindle 12. There are the balls or rollers 24 and the outer race 26. The outer race 26 contacts the housing 14. In some embodiments of the invention, ceramic bearings are used. Ceramic bearings are hard and can provide rigidity and reduced friction. In other embodiments of the invention, steel bearings are used. While live center 10 shows needles and ball bearings, other bearing types may be used in accordance with the present invention. Embodiments of the invention are not limited to that as shown.

According to some embodiments of the present invention, the ball bearings 20 are lubricated by oil. Oil may be added to the ball bearings 20 by an oil inlet 28. The oil inlet 28 is covered by a brass washer 30 held in place by a screw 32. To add oil to the inlet 28, the screw 32 and the washer 30 is removed and oil may be added.

During times of nonuse, the lubricating oil may drip down to the lower set of ball bearings 20 and form a film of oil reserve at the bottom of the housing. Once the spindle 12 starts to turn, the oil will be circulated around the spindle 12 and the ball bearings 20 will form a semi-even layer of oil throughout the ball bearings 20 and provide adequate lubrication.

From time to time, oil may work itself out of the area where the ball bearings 20 are. Some embodiments of the present invention have seals to inhibit the leaking lubricating oil out of the live center, and those seals will be discussed in more detail below. Other embodiments of the present invention may use other types of lubrication schemes for the bearings 20. For example, grease or other lubricants may be used in accordance with the present invention. The discussion of oil being used as a lubricant is meant to be exemplary rather than limiting.

According to some embodiments of the present invention, a mid portion of the spindle 12 has threads 34 upon which a tightening nut 36 engages the threads and compresses the bearings 20 against a flange 38 located on the spindle 12. To the left of the needle bearings 18 are internal threads 37. Screwed into the treads 37 is a locking screw 39. The locking screw 39 maintains lubricating oil within the live center while providing access to the needle bearings 18.

FIG. 2 is an enlargement of a front portion of the live center 10 illustrated in FIG. 1. FIG. 2 has been enlarged in order to show detail to provide clarity in explaining an embodiment of the invention. As shown in FIG. 2, a spindle 12 is mounted within the housing 14 where the housing 12 contacts the inner races 22 of the bearings 20. According to some embodiments of the invention, oil is used to lubricate the bearings 20 and creates a fine coat on the inner races 22, the balls or rollers 24 and the outer races 26 in order to facilitate free movement of the bearings 20.

It is desirable to maintain the oil within the bearings 20 rather than allowing the oil to leak out of the live center 10. An adaptor 40 is located on the housing 14 and is mounted to the housing 14 by a mounting screw 42. Among other functions, the adaptor 40 has a channel 44 which houses an O-ring seal 46. The O-ring seal 46 is made of a resilient material which in some embodiments of the invention may be rubber or any other suitable resilient material. The O-ring 46 is situated in the channel 44 to hinder or impede movement of oil from the bearings 20 along the boundary 48 between the housing 14 and the adaptor 40. In the unlikely event that a contaminant such as cutting fluid occurs in the boundary 48 between the housing 14 and the adaptor 40, the O-ring 46 will also hinder movement of that contaminant into the area where the bearings 20 are located.

In order to help prevent contaminating fluid such as cutting fluid and chips, and other debris, from entering the live center 10, a number of features are provided on the embodiment of the invention shown in FIG. 2. For example, a labyrinth seal 50 is used. The labyrinth seal 50 includes two parts: a cover 52, which is mounted to the housing 14 of the live center 10 via a mounting screw 42. Optionally, as shown, the mounting screw 42 also attaches the adaptor 40 to the housing 14. In other embodiments of the invention, the shield 54 may be attached in other suitable manners to the housing 14 either directly or via some other element such as the adapter 40 for example. The cover 52 is located close to the spindle 12 and provides a narrow gap 54 between the spindle 12 and the cover 52. This narrow gap 54 is useful to prevent large contaminants such as chips and other undesirable debris from entering the interior of the live center 10. The gap is wide enough to permit the spindle 12 to turn while the cover 52 remains stationary attached to the housing 14. In some embodiments of the invention, the gap 54 is located 0.02 of an inch from the spindle 12. Other embodiments of the invention may include gaps 54 located other distances away from the spindle 12.

The other part of the labyrinth seal 50 is the shield 56. The shield 56 is mounted onto the spindle 12 and in some embodiments of the invention, is press fit onto the spindle 12. In other embodiments of the invention, the shield 56 may be integral with the spindle 12.

In some embodiments of the invention, the shield and cover 52 are made of steel, however, they can also be made of other materials such as other metals, plastics, or other materials.

One advantage of having the cover 52 and the shield 56 being made of steel or stainless steel is that the cover 52 and shield 56 can protect the interior of the live center 10 from heat. Current manufacturing techniques often involve heating a work piece while it is being worked on by a machine tool. In some instances the apparatus used to heat the workpiece can be located near the live center 10 and heat the live center 10. Because of the relatively high heat capacity of steel, the shield 56 and cover 52, if made of steel or stainless steel, can absorb a significant amount of heat before the heat enters into the live center. Reducing heat from entering the live center can aid in protecting interior pieces such as the contact seal 66 (discussed more below).

The cover 52 and the shield 56 together form a labyrinth path 58 for which the narrow gap 54 is the entrance. The labyrinth path 58 has turns to inhibit the flow or ingress of contaminants into the live center 10. There is a large chamber 60 which is part of the labyrinth path 58. As the fluid flows through the labyrinth path 58 at the entrance to the large chamber 60, the pressure of the contaminating fluid will drop due to the well known phenomenon of pressure drop associated with a fluid expanding into a larger area. Thus, if contaminating fluid is located in the labyrinth 58 before the large chamber 60 will have a higher pressure than contaminating fluid in the labyrinth path 58 and the part of the path after the large chamber 60.

Should fluid continue to flow into the live center 10 along the labyrinth path 58, it may be drained out of the live center via a drain hole 62. The drain hole 62 is located in the cover 52 on the bottom portion of the live center 10 so that gravity will encourage any contaminating fluid to flow down and out of the drain hole 62. While the drain hole 62 is illustrated in the cover 52, other embodiments of the invention may include a drain hole located in another suitable location or having no drain hole at all.

If the contaminant does not flow out of the drain hole 62, but continues into the live center 10 along the labyrinth path 58, it will encounter the surface of the spindle 12 on the lip or flange portion 38. The flange 38 and the adaptor 40 define a narrow channel 64 which will inhibit the flow of contaminants or fluid into the live center 10. In some embodiments of the invention, the adaptor 40 is spaced about 0.015 of an inch away from the flange 38 on the adaptor 12, thus providing a narrow passageway 64 for contaminants to flow into the live center 10.

In some embodiments of the invention, the passageway 64 is blocked by a contact seal 66. The contact seal 66 is set within a bore 68 in the adaptor 40. The contact seal 66 is made of a resilient material. For example, in some embodiments of the invention, the contact seal 66 is synthetic acrylonitrile-butadine rubber. Seals made of this material have a high elasticity and low friction which is good for high RPM applications. Other suitable seals 66 are made of nitrile. Other seal materials can be used to meet certain application requirements. The contact seal 66 contacts both the adaptor 40 and the spindle 12 at the flange 38. The contact seal 66 blocks the narrow channel 64 to prevent or hinder contaminants from flowing further into the live center 10. The contact seal lip 70 is facing the bearings 20.

In some embodiments of the invention, the contact seal 66 provides an additional function of preventing or hindering oil or lubricant from flowing out of the area where the bearings 20 are located and out of the live center 10 along the spindle 12. In some embodiments of the invention, the contact seal 66 has a seal lip 70 facing in. The contact seal 66 is mounted within the live center 10 on the spindle 12 so that the seal lip 70 is facing the bearings 20 rather than the narrow channel 64.

While the embodiment shown shows the contact seal 66 located between the adaptor 40 and the spindle 12 at the flange section 38, other embodiments in accordance with the invention may include a contact seal 66 located along the spindle 12 but not necessarily contacting the adaptor 40, but may contact some other portion of the live center such as the housing 14 or some other structure. The seal may also be of a double lip construction. This design has a sealing (contact) lip and a non-contact protecting lip.

Although an example of the sealing system is shown on a live center 10, it will be appreciated that the sealing system can be used on other items having a similar configuration where a rotating shaft is mounted inside a housing. Also, although the system is useful in the manufacturing industry, it can be used in other industries. The embodiment shown is meant to be exemplary only, and by no means limiting.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A live center comprising:
   a housing;
   a spindle disposed, at least in part, within the housing;
   bearings providing a rolling connection between the spindle and the housing;
   a seal mounted to at least one of: the spindle and housing, and configured to reduce an amount of contaminant from entering the housing, wherein the seal is a labyrinth seal having a shield connected to the spindle and a cover connected to the housing, and further wherein the shield and the spindle define labyrinth type passage way; and
   an adapter connected to the housing, wherein the adapter is connected to the housing via a screw that also connects the cover to the housing.

2. A live center comprising:
   a housing;
   a spindle disposed, at least in part, within the housing;
   bearings providing a rolling connection between the spindle and the housing;
   a seal mounted to at least one of: the spindle and housing, and configured to reduce an amount of contaminant from entering the housing, wherein the seal is a labyrinth seal having a shield connected to the spindle and a cover connected to the housing, and further wherein the shield and the spindle define labyrinth type passage way; and
   a second seal contacting the spindle and configured to at least one of: impede lubricating oil from flowing away from the bearings along the spindle and to impede contaminant from leaking into the bearing along the spindle.

3. The live center of claim 2, wherein the second seal is made of synthetic acrylonitrile-butadine rubber.

4. The live center of claim 2, further comprising an adaptor attached to the housing and the second seal.

5. The live center of claim 2, further comprising a flange on the spindle and the second seal contacts the flange.

6. A live center comprising:
   a housing;
   a spindle disposed, at least in part, within the housing;
   bearings providing a rolling connection between the spindle and the housing;

a seal mounted to at least one of: the spindle and housing, and configured to reduce an amount of contaminant from entering the housing, wherein the seal is a labyrinth seal having a shield connected to the spindle and a cover connected to the housing, and further wherein the shield and the spindle define labyrinth type passage way; and threads on an end of the spindle and a nut on the threads urging at least some of the bearings against a flange on the spindle.

7. A live center comprising:

a housing;

a spindle disposed, at least in part, within the housing;

bearings providing a rolling connection between the spindle and the housing;

a seal mounted to at least one of: the spindle and housing, and configured to reduce an amount of contaminant from entering the housing, wherein the seal is a labyrinth seal having a shield connected to the spindle and a cover connected to the housing, and further wherein the shield and the spindle define labyrinth type passage way;

an opening in the housing configured to permit lubricating oil to enter the housing and lubricate at least some of the bearings; and a screw assembly configured to enter and close the opening in the housing.

8. A live center comprising:

a housing;

a spindle disposed, at least in part, within the housing;

bearings providing a rolling connection between the spindle and the housing;

a seal mounted to at least one of: the spindle and housing, and configured to reduce an amount of contaminant from entering the housing, wherein the seal is a labyrinth seal having a shield connected to the spindle and a cover connected to the housing, and further wherein the shield and the spindle define labyrinth type passage way; and a lock nut screwed into the housing and configured to maintain lubricant from flowing out one end of the housing.

9. A live center comprising:

a housing;

a spindle mounted in the housing;

a first seal for impeding contaminant from entering the housing along the spindle;

a second seal for impeding contaminant from continuing to move into the live center; and a third seal for impeding contaminant from moving along the spindle.

10. The live center of claim 9, wherein the first seal is a shield proving a narrow gap between the cover and the spindle.

11. The live center of claim 9, wherein the second seal is labyrinth seal.

12. The live center of claim 11, wherein the third seal is made of a resilient material and contacts a ridge portion of the spindle.

13. The live center of claim 12, wherein the resilient material is synthetic acrylonitrile-butadine rubber.

14. The live center of claim 9, further comprising a fourth seal including an adapter providing a narrow gap between the adapter and the spindle for restricting contaminant moving along the spindle further into the live center.

15. The live center of claim 9, further comprising an O-ring seal located between the housing and an adaptor.

16. The live center of claim 9, further comprising a drain hole configured to permit contaminant that has passed through the first and second seal to drain out of the live center.

17. The live center of claim 9, wherein at least one of the first and second seal are comprised of at least one of steel and stainless steel.

18. A live center comprising:

a housing;

a spindle located in the housing;

a first sealing means for impeding fluid from moving along the spindle into the housing; and a second sealing means for reducing a pressure associated with a contaminant when the contaminant contacts the first sealing means.

19. The live center of claim 18, wherein the second sealing means includes a labyrinth path for contaminant to flow through in order to contact the second sealing means.

20. The live center of claim 18, further comprising a relatively large chamber as part of the labyrinth path.

21. The live center of claim 18 further comprising a contact seal configured to inhibit a contaminant flow along the spindle.

22. The live center of claim 21, wherein the contact seal is made of synthetic acrylonitrile-butadine rubber.

23. The live center of claim 18 wherein the second sealing means is comprised of at least one of steel and stainless steel.

* * * * *